United States Patent Office

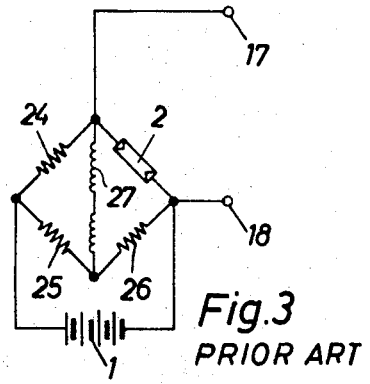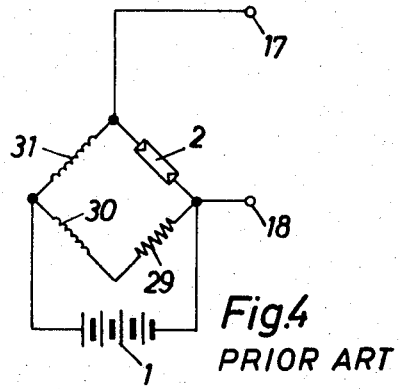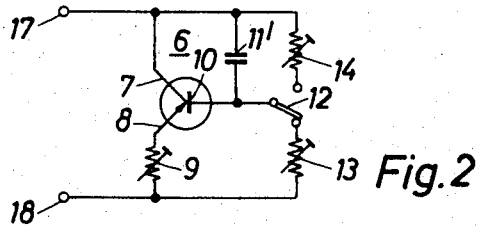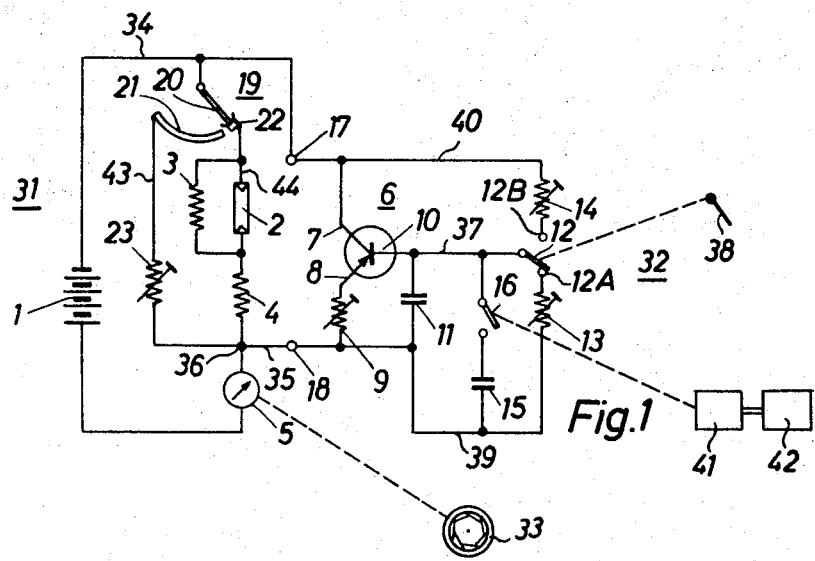

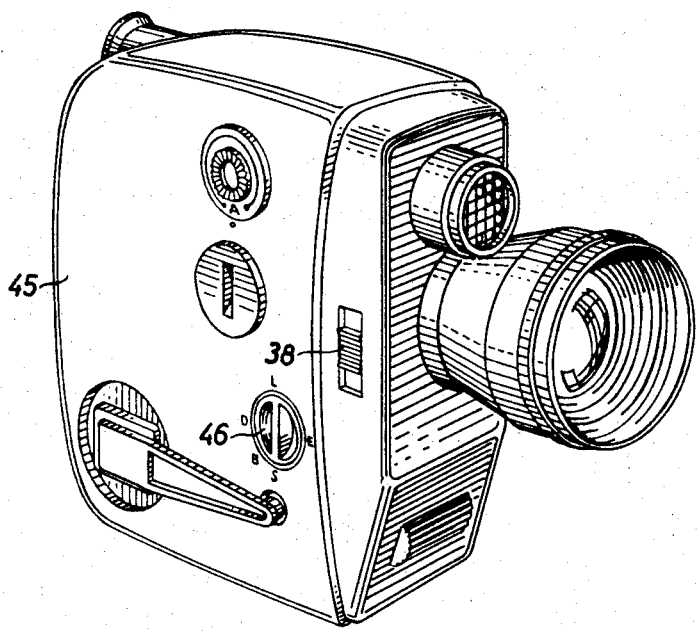

3,419,325
Patented Dec. 31, 1968

3,419,325
MOTION PICTURE CAMERA FADE-IN AND FADE-OUT CONTROL ARRANGEMENT
Helmut Mayr and Richard Pelte, Munich, Germany, assignors to Agfa-Gevaert A.G., Leverkusen, Germany
Filed Sept. 21, 1965, Ser. No. 488,995
Claims priority, application Germany, Sept. 25, 1964,
A 47,163
16 Claims. (Cl. 352—91)

ABSTRACT OF THE DISCLOSURE

An arrangement in motion picture cameras for producing controlled fade-in and fade-out of a picture. The diaphragm of the motion picture camera is coupled to an electro-mechanical instrument which is current sensitive. A photo-resistor exposed to the light prevailing at the object being photographed determines the current through the electro-mechanical instrument. The opening of the diaphragm is thereby made a function of the prevailing light intensity. Fade-in and fade-out of a picture are produced by gradually varying the current through the electro-mechanical instrument.

---

The present invention relates to a motion picture camera fade-in and fade-out control arrangement. More particularly, the invention relates to a motion picture camera fade-in and fade-out control arrangement by diaphragm control.

A fade-in, fade-out arrangement provides a gradual transition from one scene to the next in a motion picture film. Such an arrangement continually darkens the picture at the end of the scene by slowly closing the diaphragm of the camera. This is known as stopping down. The next scent is brightened gradually at the beginning for the same period of time that the preceding scene was darkened, so that the combined effect of the fade-out and fade-in is a gradual transition from the one scene to the next.

A known type of fade-in, fade-out arrangement utilizes a Wheatstone type bridge for regulating the light with four resistors. One of the resistors is a photoresistor, one is manually adjustable for setting the film speed, for example, and another is manually adjustable. The resistors are so connected that the diaphragm is opened and closed, in accordance with the adjustment of the last-mentioned manually adjustable resistor, beyond the diaphragm value set by the diaphragm control in accordance with the light requirements. In such an arrangement, however, the variation in brightness is dependent upon the control of the manually adjustable resistor, such variation including the degree of brightness and the rate of change of brightness. This places a heavy burden on the cameraman and requires the services of a considerably experienced operator in order to achieve uniformity of fade-out and fade-in, including uniformity in the period of time for fade-out and for fade-in.

A known type of arrangement which attempts to overcome these difficulties provides automatic control of fade-out and fade-in. In such an arrangement, the exposure time is continually varied by a diaphragm disc which is rotated relative to a rotary shutter. Such an arrangement is expensive.

The principal object of the present invention is to provide a new and improved motion picture fade-in and fade-out control arrangement.

An object of the present invention is to provide an inexpensive motion picture fade-in and fade-out control arrangement which is efficient, effective and reliable in operation.

Another object of the present invention is to provide a fully automatic motion picture fade-in and fade-out control arrangement which is simple in structure and comprises a few parts.

Another object of the present invention is to provide a motion picture fade-in and fade-out control arrangement which provides an equal period of time for fade-in and fade-out.

Still another object of the present invention is to provide a motion picture fade-in and fade-out control arrangement which does not present a heavy load to the motor of the motion picture camera.

In accordance with the present invention, a motion picture camera fade-in and fade-out control arrangement in a motion picture camera is provided for an exposure control circuit comprising a diaphragm position in the light path of the camera, a current-controlled diaphragm control mechanically coupled to the diaphragm and a photoresistor positioned in the light path from an object to be photographed and connected to the diaphragm control for varying the magnitude of current in the diaphragm control and thereby varying the opening of the diaphragm in accordance with the intensity of light in the light path from the object to be photographed. The motion picture camera fade-in and fade-out control arrangement, in accordance with the present invention, comprises a circuit arrangement connected to the exposure control circuit for selectively providing a gradually increasing additional current to the exposure control circuit to gradually decrease the opening of the diaphragm and thereby produce fade-out of a picture in the motion picture camera and gradually decreasing the additional current to the exposure control circuit to gradually increase the opening of the diaphragm and thereby produce fade-in of a picture in the motion picture camera. The circuit arrangement comprises a transistor having emitter, base and collector electrodes connected in parallel with the photoresistor and a time constant circuit connected to the base electrode of the transistor for controlling the current flow through the transistor. The time constant circuit comprises a capacitor connected between the base and emitter electrodes of the transistor and a resistor connected to the base electrode, the time constant circuit having a time constant which is variable thereby varying the period of time for fade-in and the period of time for fade-out.

In order that the present invention may be readily carried into effect, it will now be described with reference to the accompanying drawings, wherein:

FIG. 1 is a circuit diagram of an embodiment of the motion picture camera fade-in and fade-out control arrangement of the present invention connected with a diaphragm control arrangement;

FIG. 2 is a circuit diagram of a modification of the embodiment of the motion picture camera fade-in and fade-out control arrangement of FIG. 1;

FIG. 3 is a circuit diagram of a known exposure regulating arrangement;

FIG. 4 is a circuit diagram of another known exposure regulating arrangement; and FIG. 5 is a perspective view of a motion picture camera utilizing the fade-in and fade-out control arrangement of the present invention.

In the figures, the same components are identified by the same reference numerals.

In FIG. 1, a diaphragm control circuit 31 is connected to terminals 17 and 18 from the left and an embodiment of the motion picture camera fade-in and fade-out control arrangement 32 of the present invention is connected to said terminals from the right.

In the diaphragm control circuit 31, a battery or other suitable source of DC voltage 1 provides the electrical energy for the circuits 31 and 32. A photoresistor 2 is positioned in the path of light coming from an object or objects photographed by the camera. The photoresistor 2 functions as a transducer to convert light variations to variations in electrical current by varying its electrical resistance. A resistor 3 connected in shunt across the photoresistor 2 and a resistor 4 connected in series with said photoresistor function as equalizing resistors in the exposure or diaphragm control circuit 31.

A rotary coil, galvanometer type, instrument 5 rotates in accordance with the magnitude of the current flowing therethrough which is the current flowing through the exposure control circuit. The rotary motion of the rotary coil instrument 5 is thus controlled primarily by the electrical resistance of the photoresistor 2, which in turn is determined by the light impinging on said photoresistor.

A diaphragm 33 of known type is positioned in the path of light entering the camera and is adjustable and functions in the usual manner to provide a proper exposure of the film in the camera to light. The rotary coil instrument 5 is mechanically coupled to the diaphragm 33 by any suitable coupling arrangement, so that rotary motion of said rotary coil instrument in one of a clockwise and counterclockwise direction decreases the opening of said diaphragm and rotary motion of said rotary coil instrument in the other of a clockwise and counterclockwise direction increases the opening of said diaphragm.

A diaphragm or exposure control circuit similar to that shown in FIG. 1 is described in FIG. 5 of United States Patent No. 3,165,037, issued Jan. 12, 1965 and a mechanically coupled diaphragm 129 is disclosed in FIG. 6 of said patent. United States Patent No. 3,165,037 also discloses the positioning of the exposure control circuit in the motion picture camera and the interrelation of said circuit and said camera. A galvanometer 47 for controlling the diaphragm and diaphragm coupling members 52 and 53 are shown in FIG. 2 of said patent.

In accordance with the present invention, the motion picture camera fade-in and fade-out control arrangement 32 comprises a transistor 6 connected between the terminals 17 and 18 in parallel with the photoresistor 2. The transistor 6 has an emitter electrode 8, a collector electrode 7 and a base electrode 10. The collector electrode 7 is directly connected to the negative polarity terminal of the battery 1 via the terminal 17 and a line 34. The emitter electrode 8 is connected to the input of the rotary coil instrument 5 via a variable current-limiting resistor 9, the terminal 18, a line 35 and a common point 36 in the connection between the resistor 4 and said rotary coil instrument.

A capacitor 11 is connected between the base electrode 10 and the variable resistor 9 so that it forms a closed loop comprising the emitter-base path of the transistor 6, the variable resistor 9 and the capacitor 11. A switch having an armature 12 connected to the base electrode 10 via a line 37 is operated by a suitable member of lever arm 38 which extends to a convenient place outside the camera to contact a first contact 12A in one position and to contact a second contact 12B in another position. When the armature 12 is in electrical contact with the contact 12A, the base electrode 10 is connected to the emitter electrode 8 via a variable resistor 13, a line 39 and the variable resistor 9. When the armature 12 is in electrical contact with the contact 12B, the base electrode 10 is connected to the collector electrode 7 via a variable resistor 14, a line 40 and the variable resistor 9.

A second capacitor 15 is connected in series with a switch 16 between the lines 37 and 39 in parallel with the capacitor 11. When the switch 16 is in its closed position, the second capacitor 15 is connected in circuit in parallel with the capacitor 11 and when said switch is in its open position, as shown in FIG. 1, said second capacitor is disconnected from the circuit. The switch 16 may be mechanically coupled to the speed control 41 for the motor 42 of the motion picture camera which drives the film through said camera. Thus, if the switch 16 is open and the drive speed of the film decreases, the speed control 41 closes the switch 16 and connects the second capacitor 15 into the circuit.

The capacitor 11 and the variable resistor 13 form a first RC time constant circuit and said capacitor and the variable resistor 14 form a second RC time constant circuit. When the second capacitor 15 is connected into the circuit by the closing of the switch 16, the time constant of either RC time constant circuit is increased relative to the speed at which the film is driven through the camera. This insures the same period of time or the same length of film for the fade-out and fade-in independently of the speed at which the film is driven through the camera. This is of particular advantage if the fade-in and fade-out are filmed at different film driving speeds.

Although the circuit arrangement of FIG. 1 discloses two capacitors 11 and 15, for two film driving speeds, this is adequate for most motion picture cameras. Any suitable number of additional capacitors may be utilized however.

In the diaphragm control circuit 31, a potentiometer 19 has a contact arm 20 in electrical contact with a split resistor having a first resistor segment 21 connected to the rotary coil instrument 5 via a line 43, a variable matching resistor 23 and the common point 36 and a second resistor segment 22 connected to the photoresistor 2 via a line 44.

The motion picture camera fade-in and fade-out control arrangement of the present invention functions as follows:

When the switch armature 12 is in electrical contact with the first contact 12A, as shown in FIG. 1, the transistor 6 is in its non-conductive condition since the base electrode 10 is connected to the emitter electrode 8 at the emitter potential. If the lever arm 38 is then manually moved to move the switch armature 12 into electrical contact with the second contact 12B, the base electrode 10 is connected to the collector electrode 7 via the variable resistor 14 and the line 40 and the transistor 6 is switched to its conductive condition.

When the transistor 6 is in its conductive condition, it conducts a current which charges the capacitor 11. The voltage at the base electrode relative to the emitter electrode gradually becomes negative so that an increasing magnitude of collector current flows and there is a current flow through the emitter-collector path of the transistor 6. The increasing collector current flows in the exposure control circuit 31 in addition to the photoresistor 2—controlled current flowing therein. This additional current thus flows through the rotary coil instrument 5. As the collector current increases in magnitude, the resultant current in the rotary coil instrument 5 therefore increases in magnitude and said rotary coil instrument gradually closes the opening of the diaphragm 33 to provide fade-out of the picture.

The collector current is limited in magnitude by the variable resistor 9 or the variable resistor 14, one of these resistors being adjusted to a value for closing the diaphragm. The variable resistor 9 is utilized as a current limiter. The period of time for the fade-in and for the fade-out is varied by variation of the RC time constant circuit 11, 13 or 11, 14. This is accomplished by variation of the variable resistor 13 or the variable resistor 14. Variation of the variable resistor 13 or 14 varies the discharge rate of the capacitor 11. The variation of the RC time constant circuit 11, 13 or 11, 14 may also be varied by variation of its capacitance. This is accomplished by connecting the second capacitor 15 into the circuit in the manner hereinbefore described.

When the switch armature 12 is moved into electrical contact with the first contact 12A, by manual movement of the lever arm 38, the capacitor 11 discharges gradually through the variable resistor 13 and the magnitude of the collector current gradually decreases. While the collector current decreases in magnitude, the picture gradually fades-in with the gradual opening on the diaphragm opening by the rotary coil instrument 5. When the potential of the base electrode 10 reaches the potential of the emitter electrode, the transistor 6 is switched to its non-conductive condition. The rotary motion of the rotary coil instrument 5 is then controlled solely by the photoresistor 2—controlled current flowing therein, since the collector current previously added thereto is then substantially zero.

The potentiometer 19 may be utilized to adjust the diaphragm 33 at the start of the fade-out or to adjust said diaphragm at the completion of the fade-in. This is of advantage when special lighting effects are utilized. Although the transistor 6 is illustrated as a PNP type transistor, an NPN type transistor may be utilized if the appropriate usual polaritey-changing circuit modifications are made. A silicon transistor is preferable because of its very small and substantially temperature-independent collector rest current. This avoids an adverse effect on the diaphragm control circuit 31 by the motion picture camera fade-in and fade-out control arrangement 32 when the transistor 6 is in its non-conductive condition.

The circuit arrangement of FIG. 1 is readily housed in a motion picture camera casing 45 shown in FIG. 5, in the manner in which the circuit arrangement of United States Patent No. 3,165,037 is housed in the camera casing of FIG. 1 of said patent, as disclosed in said patent. The film driving speed settings are made by a dial 46. The lever arm or switch arm 38 is conveniently positioned for manual operation by the first finger of the right hand of the cameraman. In its middle position, shown in FIG. 5, the lever arm 38 does not effect the diaphragm opening, since in such position of said lever arm the switch armature 12 does not contact either of the contacts 12A and 12B. When the lever arm 38 is moved to one of its up and down end positions such as for example, its down position, the switch armature 12 is moved into electrical contact with the first contact 12A and the control arrangement 32 functions to provide fade-in of the picture. When the lever arm 38 is moved to the other of its up and down end positions such as, for example, its up position, the switch armature 12 is moved into electrical contact with the second contact 12B and the control arrangement 32 functions to provide fade-out of the picture.

FIG. 2 illustrates a modification of the embodiment of the motion picture camera fade-in and fade-out control arrangement 32 of FIG. 1. The capacitor 11' is connected between the base electrode 10 and the collector electrode 7 instead of between the base electrode and the emitter electrode variable resistor 9 as in FIG. 1. The capacitor 11' thus forms a closed loop with the collector-base path of the transistor 6 in the modification of FIG. 2.

The motion picture camera fade-in and fade-out control arrangement of the present invention may be utilized with any suitable exposure or diaphragm control circuit 31 such as, for example, the exposure control circuit of FIG. 3 or the exposure control circiut of FIG. 4. In the known exposure control circuit of FIG. 3, the bridge comprises resistors 24, 25 and 26, as well as the photoresistor 2. The bridge is energized by the battery 1.

The rotary coil instrument is connected in the bridge, its coil 27 being connected across diagonal points of the bridge. The coil 27 of the rotary coil instrument is mechanically coupled to the diaphragm of the camera in the manner of FIG. 1. The motion picture camera fade-in and fade-out control arrangement 32 of the present invention may then be connected to the terminals 17 and 18, in the manner of FIG. 1, to provide fade-out and fade-in of the picture.

In the known exposure control circuit of FIG. 4, the bridge comprises a resistor 29, the photoresistor 2 and the oppositely wound coils 30 and 31 of the rotary coil instrument. The bridge is energized by the battery 1. The coils 30 and 31 of the rotary coil instrument is mechanically coupled to the diaphragm of the camera in the manner of FIG. 1. The motion picture camera fade-in and fade-out control arrangement 32 of the present invention may then be connected to the terminals 17 and 18, in the manner of FIG. 1, to provide fade-out and fade-in of the picture.

While the invention has been described by means of specific examples and in specific embodiments, we do not wish to be limited thereto, for obvious modifications will occur to those skilled in the art without departing from the spirit and scope of the invention.

What is claimed as new and desired to be secured by Letters Patent is:

1. A motion picture camera fade-in and fade-out control arrangement in a motion picture camera for an exposure control circuit comprising a diaphragm positioned in the light path of said camera, current-controlled diaphragm control means mechanically coupled to said diaphragm and photoresistor means positioned in the light path from an object to be photographed and connected to said diaphragm control means for varying the magnitude of current in said diaphragm control means and thereby varying the opening of said diaphragm in accordance with the intensity of light in the light path from said object to be photographed, said motion picture camera fade-in and fade-out control arrangement comprising a circuit arrangement connected to said exposure control circuit for selectively providing a gradually increasing additional current to said exposure control circuit to gradually decrease the opening of said diaphragm from a position commensurate with the prevailing light conditions and thereby produce fade-out of a picture in said motion picture camera so that excessive transmission of light through said diaphragm is avoided at the instant of decreasing the opening of said diaphragm, and gradually decreasing said additional current to said exposure control circuit to gradually increase the opening of said diaphragm to a position commensurate with the prevailing light conditions and thereby produce fade-in of a picture in said motion picture camera, whereby the rates of decreasing and increasing the opening of said diaphragm for producing fade-out and fade-in of a picture are controlled as a predetermined function of time, said rate of decreasing beginning from the instant that said diaphragm opening corresponds to the prevailing light conditions to avoid excessive light transmission through said diaphragm at the initial period of camera operation.

2. A motion picture camera fade-in and fade-out control arrangement as claimed in claim 1, wherein said circuit arrangement comprises a transistor connected in parallel with said photoresistor means and a time constant circuit connected to said transistor for controlling the current flow therethrough.

3. A motion picture camera fade-in and fade-out control arrangement as claimed in claim 2, further comprising means in said time constant circuit for varying the time constant of said time constant circuit thereby to vary the period of time for fade-in and the period of time for fade-out.

4. A motion picture camera fade-in and fade-out control arrangement as claimed in claim 1, wherein said circuit arrangement comprises a transistor having emitter, base and collector electrodes connected in parallel with said photoresistor means and a time constant circuit connected to the base electrode of said transistor for controlling the current flow through said transistor.

5. A motion picture camera fade-in and fade-out control arrangement as claimed in claim 4, wherein said time constant circuit comprises a capacitor connected between the base and emitter electrodes of said transistor and a resistor connected to said base electrode.

6. A motion picture camera fade-in and fade-out control arrangement as claimed in claim 5, further comprising means in said time constant circuit for varying the time constant of said time constant circuit thereby to vary the period of time for fade-in and the period of time for fade-out.

7. A motion picture camera fade-in and fade-out control arrangement as claimed in claim 4, wherein said time constant circuit comprises a capacitor connected between the base and collector electrodes of said transistor and a resistor connected to said base electrode.

8. A motion picture camera fade-in and fade-out control arrangement as claimed in claim 7, further comprising means in said time constant circuit for varying the time constant of said time constant circuit thereby to vary the period of time for fade-in and the period of time for fade-out.

9. A motion picture camera fade-in and fade-out control arrangement as claimed in claim 4, further comprising switch means for selectively connecting the base electrode of said transistor to one of the emitter and collector electrodes thereof.

10. A motion picture camera fade-in and fade-out control arrangement in a motion picture camera for an exposure control circuit comprising a diaphragm positioned in the light path of said camera, current-controlled diaphragm control means mechanically coupled to said diaphragm and photoresistor means positioned in the light path from an object to be photographed and connected to said diaphragm; control means for varying the magnitude of current in said diaphragm control means and thereby varying the opening of said diaphragm in accordance with the intensity of light in the light path from said object to be photographed, said motion picture camera fade-in and fade-out control arrangement comprising a circuit arrangement connected to said exposure control circuit for selectively providing a gradually increasing additional current to said exposure control circuit to gradually decrease the opening of said diaphragm and thereby produce fade-out of a picture in said motion picture camera, and decreasing said additional current to said exposure control circuit to gradually increase the opening of said diaphragm and thereby to produce fade-in of a picture in said motion picture camera, said circuit arrangement comprising a transistor having emiter, base and collector electrodes connected in parallel with said photoresistor means and a time constant circuit connected to the base electrode of said transistor for controlling the current flow through said transistor, said time constant circuit comprising a capacitor connected between the base and the emitter electrodes of said transistor, a first resistor connected at one end to the emitter electrode of said transistor and a second resistor connected at one end to the collector electrode of said transistor, and further comprising switch means for selectively connecting the base electrode of said switch means to the other end of one of said first and second resistors.

11. A motion picture camera fade-in and fade-out control arrangement as claimed in claim 10, wherein each of said first and second resistors is a variable resistor.

12. A motion picture camera fade-in and fade-out control arrangement as claimed in claim 10, further comprising a current limiting variable resistor connected to said emitter electrode.

13. A motion picture camera fade-in and fade-out control arrangement in a motion picture camera for an exposure control circuit comprising a diaphragm positioned in the light path of said camera, current-controlled diaphragm control means mechanically coupled to said diaphragm and photoresistor means positioned in the light path from an object to be photographed and connected to said diaphragm control means for varying the magnitude of current in said diaphragm control means and thereby varying the opening of said diaphragm in accordance with the intensity of light in the light path from said object to be photographed, said motion picture camera fade-in and fade-out control arrangement comprising a circuit arrangement connected to said exposure control circuit for selectively providing a gradually increasing additional current to said exposure control circuit for gradually decreasing the opening of said diaphragm and thereby produce fade-out of a picture in said motion picture camera, and gradually decreasing said additional current to said exposure control circuit to gradually increase the opening of said diaphragm and thereby to produce fade-in of a picture in said motion picture camera, said circuit arrangement comprising a transistor having emitter, base and collector electrodes connected in parallel with said photoresistor means and a time constant circuit connected to the base electrode of said transistor for controlling the current flow through said transistor, said time constant circuit comprising a capacitor connected between the base and the emitter electrodes of said transistor and a resistor connected to said base electrode, and further comprising a second capacitor and switch means connected to the base electrode of said transistor between said transistor and said second capacitor for selectively connecting said second capacitor in series with said first-mentioned capacitor to vary the capacitance of said time constant circuit.

14. A motion picture camera fade-in and fade-out control arrangement as claimed in claim 13, wherein said motion picture camera includes motor means for driving film through said camera and speed control means coupled to said motor means for varying the driving speed of the film, and further comprising coupling means mechanically coupling said switch means to said speed control means.

15. A motion picture camera fade-in and fade-out control arrangement as claimed in claim 9, further comprising manual lever arm means convenient to the outside of said motion picture camera and coupling means mechanically coupling said switch means to said manual lever arm means.

16. A motion picture camera fade-in and fade-out control arrangement as claimed in claim 10, further comprising manual lever arm means convenient to the outside of said motion picture camera and coupling means mechanically coupling said switch means to said manual lever arm means.

References Cited
UNITED STATES PATENTS

| | | | |
|---|---|---|---|
| 2,518,717 | 8/1950 | Rath | 352—141 |
| 3,230,847 | 1/1966 | Gregory et al. | 352—141 |

JULIA E. COINER, *Primary Examiner.*

U.S. Cl. X.R.

352—141